US009679079B2

(12) United States Patent
Plakhov et al.

(10) Patent No.: US 9,679,079 B2
(45) Date of Patent: Jun. 13, 2017

(54) SEARCH QUERY SUGGESTIONS BASED IN PART ON A PRIOR SEARCH AND SEARCHES BASED ON SUCH SUGGESTIONS

(71) Applicant: YANDEX EUROPE AG, Lucerne (CH)

(72) Inventors: Andrey Grigorievich Plakhov, Sergiev Posad (RU); Svetlana Jurievna Shorina, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 257 days.

(21) Appl. No.: 14/415,689

(22) PCT Filed: Jul. 15, 2013

(86) PCT No.: PCT/US2013/050458
§ 371 (c)(1),
(2) Date: Jan. 19, 2015

(87) PCT Pub. No.: WO2014/014807
PCT Pub. Date: Jan. 23, 2014

(65) Prior Publication Data
US 2015/0178302 A1 Jun. 25, 2015

(30) Foreign Application Priority Data

Jul. 19, 2012 (WO) ............... PCT/RU2012/000576

(51) Int. Cl.
G06F 17/30 (2006.01)
(52) U.S. Cl.
CPC ...... G06F 17/3097 (2013.01); G06F 17/3064 (2013.01); G06F 17/30864 (2013.01)

(58) Field of Classification Search
CPC ................. G06F 17/3064; G06F 17/3097
(Continued)

(56) References Cited

U.S. PATENT DOCUMENTS 7,917,528 B1  3/2011  Dave et al.
7,953,746 B1* 5/2011  Garg ............... G06F 17/30864
                                              707/762
(Continued)

FOREIGN PATENT DOCUMENTS

CA  2777354 A1  4/2011
CN  101884044 A  11/2010
(Continued)

OTHER PUBLICATIONS

Article entitled "Yahoo!'s New Search Box of Awesome: Search Direct", by Yahoo, dated Mar. 23, 2011.*
(Continued)

Primary Examiner — Mahesh Dwivedi
(74) Attorney, Agent, or Firm — BCF LLP

(57) ABSTRACT

Method comprising: receiving from a client device a first search query including at least one first query search term; sending first search results of a first search; receiving from the client device elements of a second search query including at least the at least one first query search term, the at least one first query search term included in the elements of the second search query not having been entered by a user of the client device in a search field in respect of the second search query; and prior receiving a second search result request from the client device in respect of the second search query, sending at least one of (i) at least one search query suggestion based on, at least in part, the elements of the second search query, and (ii) second search results of a second search conducted using the at least one search query suggestion.

18 Claims, 7 Drawing Sheets

(58) Field of Classification Search
USPC .......................................................... 707/759
See application file for complete search history.

(56) References Cited

U.S. PATENT DOCUMENTS

| | | | |
|---|---|---|---|
| 8,122,011 B1 | 2/2012 | Garg et al. | |
| 8,577,911 B1 | 11/2013 | Stepinski et al. | |
| 8,688,667 B1* | 4/2014 | Kurzion | G06F 17/30867 |
| | | | 706/16 |
| 8,725,756 B1* | 5/2014 | Garg | G06F 17/30902 |
| | | | 707/750 |
| 9,342,626 B1* | 5/2016 | Das | G06F 17/3097 |
| 2005/0044076 A1 | 2/2005 | Wu et al. | |
| 2005/0222981 A1 | 10/2005 | Lawrence et al. | |
| 2005/0283468 A1* | 12/2005 | Kamvar | G06F 17/30646 |
| 2006/0080321 A1* | 4/2006 | Horn | G06F 17/30867 |
| 2006/0190436 A1* | 8/2006 | Richardson | G06F 17/3064 |
| 2007/0061317 A1 | 3/2007 | Ramer et al. | |
| 2008/0114751 A1* | 5/2008 | Cramer | G06F 17/30554 |
| 2008/0154859 A1 | 6/2008 | Chi et al. | |
| 2009/0024581 A1 | 1/2009 | Pickens et al. | |
| 2009/0083232 A1 | 3/2009 | Ives et al. | |
| 2009/0144262 A1 | 6/2009 | White et al. | |
| 2009/0240683 A1 | 9/2009 | Lazier et al. | |
| 2009/0287680 A1 | 11/2009 | Paek et al. | |
| 2009/0307205 A1 | 12/2009 | Churchill et al. | |
| 2010/0082604 A1* | 4/2010 | Gutt | G06F 17/30648 |
| | | | 707/721 |
| 2010/0094835 A1* | 4/2010 | Lu | G06F 17/30672 |
| | | | 707/705 |
| 2010/0185644 A1 | 7/2010 | Gutt et al. | |
| 2011/0035403 A1 | 2/2011 | Isamalon | |
| 2011/0055192 A1 | 3/2011 | Tang et al. | |
| 2011/0093488 A1* | 4/2011 | Amacker | G06F 17/30873 |
| | | | 707/767 |
| 2011/0191321 A1 | 8/2011 | Gade et al. | |
| 2011/0191363 A1 | 8/2011 | Bell et al. | |
| 2011/0191364 A1* | 8/2011 | LeBeau | G06F 17/30672 |
| | | | 707/767 |
| 2012/0047134 A1 | 2/2012 | Hansson et al. | |
| 2012/0047135 A1 | 2/2012 | Hansson et al. | |
| 2012/0124071 A1 | 5/2012 | Gebhard et al. | |
| 2012/0130978 A1 | 5/2012 | Li et al. | |
| 2012/0131035 A1 | 5/2012 | Yang et al. | |
| 2012/0179705 A1 | 7/2012 | Kumaran et al. | |
| 2012/0254217 A1* | 10/2012 | Ali | G06F 17/30864 |
| | | | 707/765 |
| 2012/0284293 A1 | 11/2012 | Nierenberg | |
| 2013/0041915 A1* | 2/2013 | Meiniel | G06F 17/30867 |
| | | | 707/769 |
| 2014/0280289 A1* | 9/2014 | Marantz | G06F 17/30392 |
| | | | 707/767 |

FOREIGN PATENT DOCUMENTS

| | | |
|---|---|---|
| GB | 2465701 A | 6/2010 |
| WO | 2005013153 A1 | 2/2005 |
| WO | 2009040574 A1 | 4/2009 |
| WO | 2009073315 A1 | 6/2009 |
| WO | 2011014978 A1 | 2/2011 |
| WO | 2011014979 A1 | 2/2011 |
| WO | 2011046808 A1 | 4/2011 |
| WO | 2011079414 A1 | 7/2011 |
| WO | 2011079415 A1 | 7/2011 |
| WO | 2012024580 A1 | 2/2012 |
| WO | 2012024585 A1 | 2/2012 |
| WO | 2012037726 A1 | 2/2012 |

OTHER PUBLICATIONS

Article entitled "Google Warning Against Letting Your Search Results Get Indexed", by Sullivan, dated Mar. 12, 2007.*
International Search Report from PCT/US2013/050458; Jan. 7, 2014; Lee W. Young.
International Search Report from PCT/RU2012/00576; Apr. 25, 2013; S. Ilyasov.
Supplementary European Search Report from EP 13 81 9353, Berlin, Mar. 15, 2016, Siodmok, Wojciech.

* cited by examiner

SEARCH QUERY SUGGESTIONS BASED IN PART ON A PRIOR SEARCH AND SEARCHES BASED ON SUCH SUGGESTIONS

CROSS-REFERENCE

The present application claims priority to PCT International Application No. PCT/RU2012/000576, filed Jul. 19, 2012, entitled "Search Query Suggestions Based in Part on a Prior Search And Searches Based on Such Suggestions", which is incorporated herein by reference in all jurisdictions allowing for incorporations-by-reference.

FIELD

The present specification relates search query suggestion systems of search engines, search query suggestions provided thereby, and searches based thereon.

BACKGROUND

The Internet provides access to a wide variety of resources, for example, video files, image files, audio files, or Web pages, including content for particular subjects, book articles, or news articles. A search engine can select one or more resources in response to receiving a search query. A search query is data that a user submits to (or causes, knowingly or unknowingly, to be submitted to or obtained by) a search engine to conduct a search to satisfy the user's informational needs. Search queries almost always include data in the form of text—e.g., one or more search query terms—as well as other information. The search engine selects and scores resources based on their relevance to the search query and on their importance relative to other resources to provide search results that link to the selected resources. The search results are typically ordered according to the scores and presented according to this order.

Given the volume of information available via the Internet, and the lack of consistency between various resources, it is not always easy for a user to formulate search query terms that will quickly and easily provide them with the information that they seek. To assist users, search engines can provide search query suggestions to users to help users satisfy their informational needs—i.e. search engines can suggest query terms that could be used to refine a search or refine a search strategy so as to yield more pertinent results. As an example, some search engines provide search query suggestions in the form of a list of search query suggestions as the user is typing in query term(s). The user can then select one of the search query suggestions from the list without having to type each of the entire search query term(s).

The user's client device typically sends the elements of a search query (including search query term(s)—which may be letters, numbers or characters—i.e. text) to the search engine with each keystroke, and the search engine provides the query suggestions with prefixes that match the entered text prior to the receipt of a search result request. Once the search query suggestions have been received by the client device, the client device displays these suggestions for user selection. In some cases, some search systems will even provide the search results for one of the search query suggestions as well (without the search engine having received a search result request from the client device). As an example, United States Patent Application Publication No. US 2012/0047134 A1 (incorporated by reference herein for all jurisdictions allowing incorporations-by-reference), published Feb. 23, 2012, assigned to Google Inc., provides information on such search systems.

While conventional search query suggestion systems work fairly well and enrich the user experience, improvements are always possible. One improvement which has been suggested is to incorporate the user's previous searches into their then current search query. As an example, United States Patent Application Publication No. US 2010/0211588 A1 (incorporated by reference herein for all jurisdictions allowing incorporations-by-reference), published Aug. 19, 2010, assigned to Microsoft Inc. provides: "Techniques described herein describe a context-aware query suggestion process. Context of a current query may be calculated by analyzing a sequence of previous queries. Historical search data may be mined to generate groups of query suggestion candidates. Using the context of the current query, the current query may be matched with the groups of query suggestion candidates to find a matching query suggestion candidate, which may be provided to the user." (Abstract) The technology described therein (and other technologies incorporating the user's past searches) is typically complicated however, and, at least in some situations, adverse to the goal of quickly and easily providing the user with information that they are seeking.

Further improvements to conventional search query suggestion systems are therefore desirable.

SUMMARY

It is an object of the technology disclosed in the present specification to ameliorate at least some of the inconveniences present in the prior art.

It is a further object of the technology disclosed in the present specification to provide an improved search query suggestion system, at least as compared with some conventional search query suggestion systems.

It has been realized that one possible amelioration to search engine suggestion query systems is to include in the elements of a search query—provided by a client device to a search engine for use in providing search query suggestions to the client device search—term(s) of a prior search, rather than having the search engine retrieve such search term(s) (of a prior search) from stored data.

Thus in one aspect, the technology described in the present specification provides a computer-implemented method comprising:
  receiving, from a client device via at least one server, a first search query and a first search result request in respect of the first search query, the first search query including at least one first query search term;
  sending, to the client device via the at least one server, first search results of a first search conducted using the first search query;
  receiving, from the client device via the at least one server, elements of a second search query, the elements of the second search query including at least the at least one first query search term, the at least one first query search term included in the elements of the second search query not having been entered by a user of the client device in a search field in respect of the second search query; and
  prior to the at least one server having received a second search result request from the client device in respect of the second search query, sending to the client device, via the at least one server, at least one of (i) at least one search query suggestion based on, at least in part, the elements of the second search query, and (ii) second search results of a second search conducted using the at least one search query suggestion.

In another aspect, the technology described in the present specification provides a system comprising: a client device; and at least one server, the at least one server having a non-transient computer information storage medium storing program instructions that when executed by a computer processor effect:

receiving, from the client device via the at least one server, a first search query and a first search result request in respect of the first search query, the first search query including at least one first query search term;

sending, to the client device via the at least one server, first search results of a first search conducted using the first search query;

receiving, from the client device via the at least one server, elements of a second search query, the elements of the second search query including at least the at least one first query search term, the at least one first query search term included in the elements of the second search query not having been entered by a user of the client device in a search field in respect of the second search query; and prior to the at least one server having received a second search result request from the client device in respect of the second search query, sending, to the client device via the at least one server, at least one of (i) at least one search query suggestion based on, at least in part, the elements of the second search query, and (ii) second search results of a second search conducted using the at least one search query suggestion.

In another aspect, the technology described in the present specification provides a non-transient computer information storage medium storing program instructions that when executed by a computer processor effect:

receiving, from the client device via the at least one server, a first search query and a first search result request in respect of the first search query, the first search query including at least one first query search term;

sending, to the client device via the at least one server, first search results of a first search conducted using the first search query;

receiving, from the client device via the at least one server, elements of a second search query, the elements of the second search query including at least the at least one first query search term, the at least one first query search term included in the elements of the second search query not having been entered by a user of the client device in a search field in respect of the second search query; and prior to the at least one server having received a second search result request from the client device in respect of the second search query, sending, to the client device via the at least one server, at least one of (i) at least one search query suggestion based on, at least in part, the elements of the second search query, and (ii) second search results of a second search conducted using the at least one search query suggestion.

In another aspect, the technology described in the present specification provides a computer-implemented method comprising:

sending, from a client device to at least one server, a first search query and a first search result request in respect of the first search query, the first search query including at least one first query search term;

receiving, by the client device from the at least one server, first search results of a first search conducted using the first search query;

sending, by the client device to the at least one server, elements of a second search query, the elements of the second search query including at least the at least one first query search term, the at least one first query search term included in the elements of the second search query not having been entered by a user of the client device in a search field in respect of the second search query; and prior to sending a second search result request in respect of the second search query from the client device to the at least one server, receiving, by the client device from the at least one server, at least one of (i) at least one search query suggestion based on, at least in part, the elements of the second search query, and (ii) second search results of a second search conducted using the search query suggestion.

In another aspect, the technology described in the present specification provides a system comprising at least one server; and a client device, the client having a non-transient computer information storage medium storing program instructions that when executed by a computer processor effect:

sending, by the client device to the at least one server, a first search query and a first search result request in respect of the first search query, the first search query including at least one first query search term;

receiving, by the client device from the at least one server, first search results of a first search conducted using the first search query;

sending, by the client device to the at least one server, elements of a second search query, the elements of the second search query including at least the at least one first query search term, the at least one first query search term included in the elements of the second search query not having been entered by a user of the client device in a search field in respect of the second search query; and prior to sending a second search result request in respect of the second search query from the client device to the at least one server, receiving, by the client device from the at least one server, at least one of (i) at least one search query suggestion based on, at least in part, the elements of the second search query, and (ii) second search results of a second search conducted using the search query suggestion.

In another aspect, the technology described in the present specification provides a non-transient computer information storage medium storing program instructions that when executed by a computer processor of a client device, effect:

sending, by the client device to at least one server, a first search query and a first search result request in respect of the first search query, the first search query including at least one first query search term;

receiving, by the client device from the at least one server, first search results of a first search conducted using the first search query;

sending, by the client device to the at least one server, elements of a second search query, the elements of the second search query including at least the at least one first query search term, the at least one first query search term included in the elements of the second search query not having been entered by a user of the client device in a search field in respect of the second search query; and prior to sending a second search result request in respect of the second search query from the client device to the at least one server, receiving, by the client device from the at least one server, at least one of (i) at least one search query suggestion based on, at least in part, the elements of the second search query, and (ii) second search results of a second search conducted using the search query suggestion.

In the context of the present specification, a "client device" is an electronic device that is under the control of a user and is capable of requesting and receiving "resources" over a network. (A "resource" is any data that can be provided by a publisher over a network and that is associated with a resource address. Resources include HTML pages, word processing documents, and portable document format (PDF) documents, images, video, and feed sources, to name just a few. Resources can include content, such as words, phrases, pictures, and so on, and may include embedded information (such as meta-information and hyperlinks) and/or embedded instructions (such as JavaScript scripts).) As an example, client devices include personal computers, tablets, smartphones, mobile communication devices, and other devices that can send and receive data over a network. A client device typically includes user applications, such as a web browsers or program applications (colloquially known as "apps"), to facilitate the sending and receiving of data over a network. A web browser, for example, typically can enable a user to generally display and interact with text, images, videos, music and other information typically located on a web page at a website on the World Wide Web or a local area network. An app is typically more specialized and limited in its capabilities.

In the context of the present specification, a "server" is a combination of a computer program running on appropriate hardware that is capable of receiving requests from client devices over a network, and carrying out those requests, or causing those requests to be carried out. The hardware may be one physical computer or one physical computer system, but neither is required to be the case with respect to the present technology. In the present context the use of the expression "at least one server" is not intended to mean that every request associated with a client device (or any particular request) will be received, carried out, or caused to be carried out, by the same server (i.e. the same software and/or hardware); it is intended to mean that any number of software elements or hardware devices may be involved in receiving/sending, carrying out or causing to be carried out any request, or the consequences of any request, associated with a client device, and all of this software and hardware may be one server or multiple servers, both of which are included within the expression "at least one server".

In the context of the present specification, the expression "component" is meant to include software (appropriate to a particular hardware context) that is both necessary and sufficient to achieve the specific function(s) being referenced.

In the present context a search engine should be understood to comprise the software components or hardware devices necessary to carry out the functions of a search engine system.

In the context of the present specification, a "search query" is information that a search engine takes into account in respect of a search to be carried out in order to provide the user with the information that the user is seeking to obtain through the search. Each piece of information is an "element" of the search query. Search queries include a variety of elements, including, but not limited to, one or more search terms (e.g. words, letters, numbers, characters, etc.), the IP address of the client device, the geographic location of the client device, the (presumed) language of the search term(s), a search account associated with the (presumed) user of the client device, and the application that the user is using on the client device in respect of the search. Although the user may or may not be aware of the various elements included within their search query, the inclusion of various elements helps to provide the user with the information that they are seeking to obtain through the search. In the present context no particular number or type of elements is generally required, although typically, the more elements provided to the search engine, the better the search results.

It should be understood that not all search elements in respect of search need be sent by the client device to the search engine. For example, some elements may be determined by the search engine itself (or by some associated system), be it from the elements sent to the search engine, or otherwise. Other elements may be stored information retrieved by the search engine, or information derived from stored information retrieved by the server.

In the context of the present specification, a "search field" is a software construct into which search term(s) may be entered by a user (irrespective of the method by which those terms are entered). A search field may, for example, be the dedicated search bar of an Internet browser (where one exists) or a multi-function bar of an Internet browser (where one exists).

In the context of the present specification, a "search result request" is an action taken by a user (or a lack of an action taken by a user) that indicates (or is presumed to indicate) that the user has completed the entry of the search query elements (that they want to enter) and is ready for the search to be carried out in respect of the search query. Typically, conventionally, the user will hit the "enter" button on the keyboard or click the "search" button with a mouse; however, a search result request may otherwise be indicated by a user. (The present invention is not restricted to any particular means of the user providing a search result request.)

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first (object)" and "third (object)" is not intended to imply any particular order, type, chronology, hierarchy or ranking (for example) of/between the objects, nor is their use (by itself) intended imply that any "second (object)" must necessarily exist in any given situation. Further, as is discussed herein in other contexts, reference to a "first" element and a "second" element does not preclude the two elements from being the same actual real-world element. Thus, for example, in some instances, a "first" (object) and a "second" (object) may be the same (object), and in other cases they may be different (objects). (Whatever the "(object)" may be.)

In the context of the present specification, the "search results" are the results of a search performed by a search engine, irrespective of the manner in which those results were obtained. (There are many ways of carrying out a search, and the present technology is not restricted to any particular method.)

In the context of the present specification, a "search query suggestion" is a proposal by a search engine to a user thereof of possible search query terms that may provide the user with the information that they are seeking to obtain through the search. Search query suggestions are typically presented to the user in the context of a graphical user interface in a drop down box (which permits the user to easily select from amongst the various suggestions), but this is not required in the present context. The present technology is not restricted to any particular method of providing search query suggestions to a user.

The present technology is believed to provide an improved search experience in respect of a search (e.g. a second search) by taking into account search term(s) of a prior search (e.g. the first search) in providing the user with search query suggestions in respect of the (second) search, without the user having to re-enter those first search term(s) and without those first term(s) having to have been stored by the search engine. I.e. search term(s) of the (first) search automatically become element(s) of the (second) search query that are sent from the client device to the search engine and are used by the search engine search query suggestion system in formulating the search query suggestions provided to the user in respect of the second search, before the user actually requests the search results in respect of the second search. (It should be understood however that merely because the first search term(s) are resent by the client device does not mean that the at least one server (search engine) cannot actually store the first search terms. Such is not prohibited in the context of the present technology. In some implementations the at least one server will store the first search terms.)

In some implementations, the elements of the second search query sent by the client device include at least one second query search term. The second query search term may be a letter, number, or character, for example, or any combinations thereof. The search engine search query suggestion system need not (and in most instances will not) await the receipt of an entire word or part of a word before providing search query suggestions to the client device in respect of the second search. (Exactly at what point the search engine will begin to send search query suggestions to the client device is a matter of search engine programming.)

Having second search query term(s) being included amongst the elements of the second search query sent by the client device upon which the search query suggestions are based, is not required to be the case, however. In some implementations, the elements of the second search query include no second query search terms at all. In such cases, the search engine search query suggestion system will not wait for the receipt of any letters, numbers, characters, etc. from the client device before providing search query suggestions to the client device in respect of a second search. In such cases, the search engine suggestion system may provide search query suggestions immediately to a client device based on other elements of the second search query received by the search engine (including the search term(s) of the prior search). As an example, the user may click the search field in a web browser on a client device, and immediately, before the user has entered any text in the field at all, elements of a (second) search query are sent by the client device, and a drop down box will appear with search query suggestions (having been received by the client), based on (at least in part) elements of the (second) search query (including the first search search term(s)) that the search engine query suggestion system received when the user clicked the search field.

In some implementations, the at least one search query suggestion is further based on, at least in part, a search history associated with at least one second query search term included in the elements of the second search query. In this respect, the search engine search query suggestion system may take into account a general search history of a multitude of search users with respect to the second query search terms in formulating the search query suggestions. (E.g. what were the search queries of users in the past of these particular second query search terms, either generally or over a particular period of time.) The analysis of the prior history may also include the general search history of a multitude search users with respect to the first query search terms. For example, the popularity of first or second search query terms or both over period of time will be analysed to determine the relevance of a particular search query suggestion. (This "general" search may be constrained by other elements of the second search query, e.g. the location device and/or presumed language of the second query search terms.)

In some implementations, the at least one search query suggestion is further based on, at least in part, a search history associated with the client device. In this respect, the search engine query suggestion system may use, for example, the IP address or the MAC address of the client device, or information stored in a cookie on the client device (any or all of which may be elements of a particular second search query sent by the client device to the server) and take into account a specific search history of this particular device in formulating the search query suggestions. (E.g. what were the search queries in the past associated with this particular device, and given that (and the other elements of the second search query), what are the probable search terms desired by the user at this time.)

In some implementations, the at least one search query suggestion is further based on, at least in part, a search history associated with a logged-in user account. In this respect, the search engine query suggestion system may use, for example, information associated with a logged in search engine user account (which may be an element of a particular second search query) and take into account a specific search history associated with that account in formulating the search query suggestions. (E.g. what were the search queries in the past associated with this particular account, and given that and the other elements of the second search query, what are the probable search terms at this time.) It should be understood that often users do not specifically log into a "search engine account", rather users log into various Internet services (e.g. email, social network, booking service, etc.) that identify a particular user and that is associated with one or more search engines.

In some implementations, the at least one search query suggestion is further based on, at least in part, search trends within a period of time preceding having received the elements of the second search query. In this respect, the search engine suggestion system may use recent search trends in formulating the search query suggestions. (Recent search trends may not have actually been trends for long enough to have influenced general search history, and therefore may be taken into account separately from general search history.)

In some implementations, the at least one search query suggestion is further based on, at least in part, a location of the client device. (E.g. a user searching for the term "lift" in California is likely seeking different information than a user searching for the same word in England.) In the present context, the "location" of the client device, may be any desired geographical subunit. For example, the location of the client device may be the city, country, region, state, country or continent in client device is located. The search query suggestion system may use this information, for example, to determine which search query suggestions to send to the client device and/or to determine the order of those suggestions. In some such implementations, the search engine may employ a filtering strategy to lower the relevance of possible search query suggestions (which might otherwise have been elevated) in view of the location of the client device.

In some implementations, the at least one search query suggestion is further based on, at least in part, a predicted language of the search terms of the second search query. (E.g. a user entering the letters CHP in English (Latin alphabet) is likely seeking different information than a user entering the letters CHP in Russian (Cyrillic alphabet.)) Again, the search query suggestion system may use this information, for example, to determine which search query suggestions to send to the client device and/or to determine the order of those suggestions.

In some implementations, the at least one search query suggestion is further based on, at least in part, at least one of a time and a time zone of the client device. (E.g. a user searching for a "screwdriver" at 10 am is not likely seeking the same information as a user searching for a "screwdriver" at 10 pm—the former may be searching for a location to purchase tool to drive a screw into a piece of wood, the latter may be searching for a location serving a particular alcoholic beverage.) In this context, the time zone of the client device is an indirect method of determining the time at the location of the client device. Again, the search query suggestion system may use this information, for example, to determine which search query suggestions to send to the client device and/or to determine the order of those suggestions.

In some implementations, the at least one search query suggestion is based on a probability analysis. Thus, the relevance of a particular search query suggestion with respect to another may be determined by analysing statistical data that may include, but is not limited to, the popularity of search query terms, history of the popularity of search query suggestions, various elements of the second search query, information associated with the client device and/or logged-in user account. The probability of the desired search query suggestion is calculated using any one of a number of statistical analyses known to those skilled in the art.

In some implementations, the method further comprises sending to the client device, via the at least one server, search query suggestions in respect of the first search query; and the at least one search query suggestion (in respect of the elements of the second search query) are based, at least in part, on first query suggestions not selected by the user. In this manner, the unselected first query suggestions are used to formulate the second query suggestions as they may suggest information that the user is not looking for. This may particularly be useful in instances wherein the user has selected none of the first search query suggestions.

In some implementations, the at least one search query suggestion is a plurality of search query suggestions. In most circumstances, more than one suggested search query will be provided to a user.

In some implementations, sending, to the client device via the at least one server, at least one of (i) at least one search query suggestion based on, at least in part, the elements of the second search query, and (ii) second search results of a second search conducted using the at least one search query suggestion, is sending, to the client device via the at least one server, both of (i) at least one search query suggestion based on, at least in part, the elements of the second search query, and (ii) second search results of a second search conducted using the at least one search query suggestion. Similarly, in some implementations, the program instructions effecting sending, via the at least one server to the client device, at least one of (i) at least one search query suggestion based on, at least in part, the elements of the second search query, and (ii) second search results of a second search conducted using the at least one search query suggestion, are program instructions for effecting sending, via the at least one server to send to the client device, both of (i) at least one search query suggestion based on, at least in part, the elements of the second search query, and (ii) second search results of a second search conducted using the at least one search query suggestion.

In some implementations, the method further comprises, receiving, from the client device via the at least one server, the first search result request; and causing, via the at least one server, the first search to be conducted to yield the first search results. Similarly, in some implementations, the program instructions further effect, receiving, from the client device via the at least one server, the first search result request; and causing, via the at least one server, the first search to be conducted to yield the first search results.

In some implementations, the method further comprises, after receiving the elements of the second search query from the client device, causing, via the at least one server, the second search to be conducted to yield the second search results. Similarly, in some implementations, the program instructions further effect after having received the elements of the second search query from the client device, causing, via the at least one server, the second search to be conducted to yield the second search results.

In some implementations, receiving, from the at least one server on the client device, least one of (i) at least one search query suggestion based on, at least in part, the elements of the second search query, and (ii) second search results of a second search conducted using the search query, is receiving from, the at least one server on the client device, both of (i) at least one search query suggestion based on, at least in part, the elements of the second search query, and (ii) second search results of a second search conducted using the search query suggestion. Similarly, in some implementations, the program instructions for effecting receiving by client device from the at least one server at least one of (i) at least one search query suggestion based on, at least in part, elements of the second search query, and (ii) second search results of a second search conducted using the search query suggestion, are program instructions for effecting receiving from the at least one server by the client device both of (i) at least one search query suggestion based on, at least in part, elements of the second search query, and (ii) second search results of a second search conducted using the search query suggestion.

In some implementations, the at least one first query search term included in the elements of the second search query (sent by the client device to the at least one server) is obtained from a portion of a uniform resource locator (URL) in respect of the at least one server with respect to the second search query. Similarly, in some implementations, the program instructions further cause the client device to obtain the first search query term included in the elements of the second search query (to be sent by the client device to the at least one server) from a portion of a uniform resource locator (URL) in respect of the at least one server with respect to the second query. Obtaining the first query search term(s) from a URL of the search engine (on the client device) with respect the second search for incorporation as an element of the second query sent by the client device to the at least one server (search engine search query suggestion system) provides a particularly simple and efficient way of obtaining this information and sending it to the search engine for query suggestion.

In some implementations, the method further comprises: after receiving the first search results and prior to sending the elements of the second search query, clearing, by the client device, the search field of any search terms having been entered by the user of the client device. Similarly, in some implementations, the program instructions further effect, after receiving the first search results and prior to sending the elements of the second search query, clearing, by the client device, the search field of any search terms having been entered by the user of the client device.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Overview

This specification describes technologies relating to providing search query suggestions in response to at least one server (a search engine) having received elements of a second search query (including the search term(s) from a first search query) from a client device; and optionally, to providing search results for at least one of the search query suggestions. The search query suggestions and search results, (when provided) are provided to the client device without the at least one server having received a search result request (e.g., without a user having selected one of the search query suggestions or having caused the client device to send a search result request to the search engine) in respect of the second search query.

Example Environment

Figure 1:
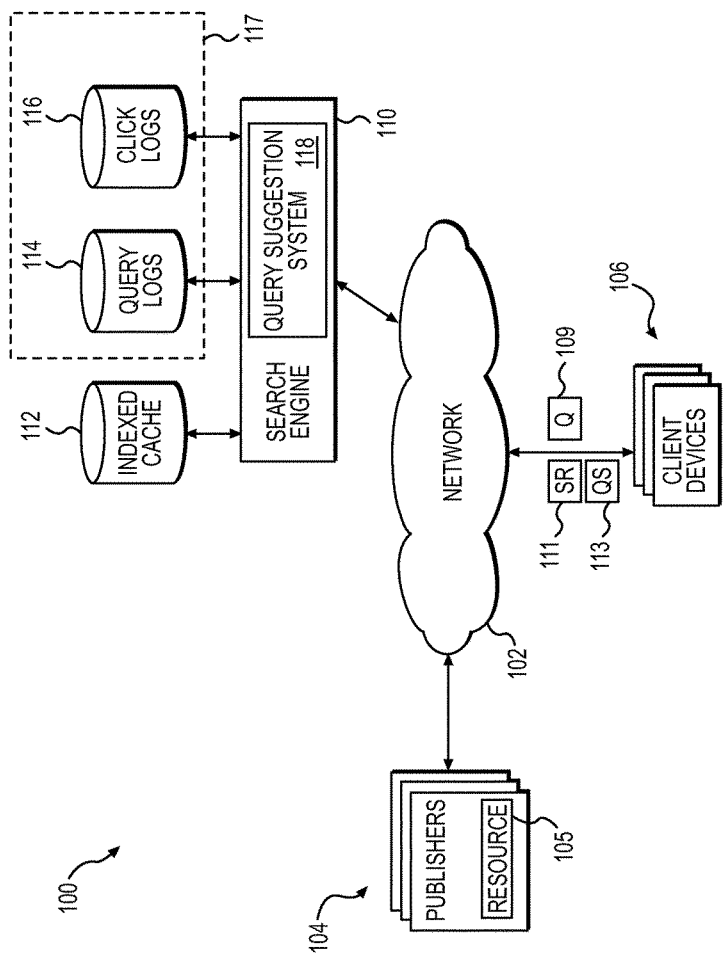
FIG. 1 is a schematic view of a sample environment with respect to the present technology.

FIG. 1 is a block diagram of an example environment 100 in which a search engine 110 provides search services. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

To facilitate searching of the resources 105, the search engine 110 identifies the resources by crawling the publisher web sites 104 and indexing the resources provided by the publisher web sites 104. The indexed and, optionally, cached copies of the resources are stored in an indexed cache 112.

The client devices 106 submit search queries 109 to the search engine 110. The search queries 109 are submitted in the form of various search request elements (not individually shown). The search request elements, may include search terms (made up of letters, characters, numbers, etc.), a unique identifier of the client device or of a user account logged in on the client device, the location of the client device, the time of the client device, etc.

In response to receiving a search result request in respect of a search query 109, the search engine 110 uses the indexed cache 112 to identify resources that are relevant to the query. The search engine 110 identifies the resources in the form of search results 111 and returns the search results to the client device 106 in search results page resource. A search result is data generated by the search engine 110 that identifies a resource that satisfies a particular search query, and includes a resource locator for the resource. An example search result may include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the client device according to the order.

The client devices 106 receive the search results pages and render the pages for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

In some implementations, the queries 109 submitted from client devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the client devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the client devices, the actions taken in response to the queries, and how often the queries are submitted.

Sample Use of a Search Engine

In one implementation, a client device is a personal computer running a version of the Microsoft™ Windows™ operating system including the Microsoft™ Internet Explorer™ web browser application program. (A client device however is not so limited, and in other embodiments client devices, may be, as non-limiting examples, a tablet computer (such as the Apple™ iPad™ running the iOS™ operating system including the Safari™ web browser and/or a Yahoo™ search app) or a smart phone (such as a Samsung™ Galaxy™ S III running the Android™ operating system including the Google™ Chrome™ browser or Google™ search app).)

In one implementation, a search engine is comprised of a crawler mechanism, an indexing mechanism, a database that may be partitioned (as would be understood by a person skilled in the art), a searching mechanism, a sorting mechanism, a search engine result interface that may be a search engine result page, a multitude of servers, a multitude of processors, random access memory, multitude of network adapters and at least one power adapter. Concrete examples are those running the major global search engines, Google™ Yahoo™, Bing™, Baidu™, Yandex™, etc.

A user desiring to carry out an Internet search will likely have several options depending on the particular client device (including both the hardware and the software) they are using. In the implementation described above, a user desiring to carry out an Internet search using the Microsoft Internet Explorer web browser will have two main options (depending on the version and the settings of the software). One option is to start to enter search terms into a dedicated search field forming part of the browser. The other option is to navigate to a web page containing a search field of a search engine. (The present technology is not however limited to either of these options. In other embodiments a user may, for example, enter search terms into a search field of an application dedicated to this purpose—such as on a smartphone)

Figure 2:
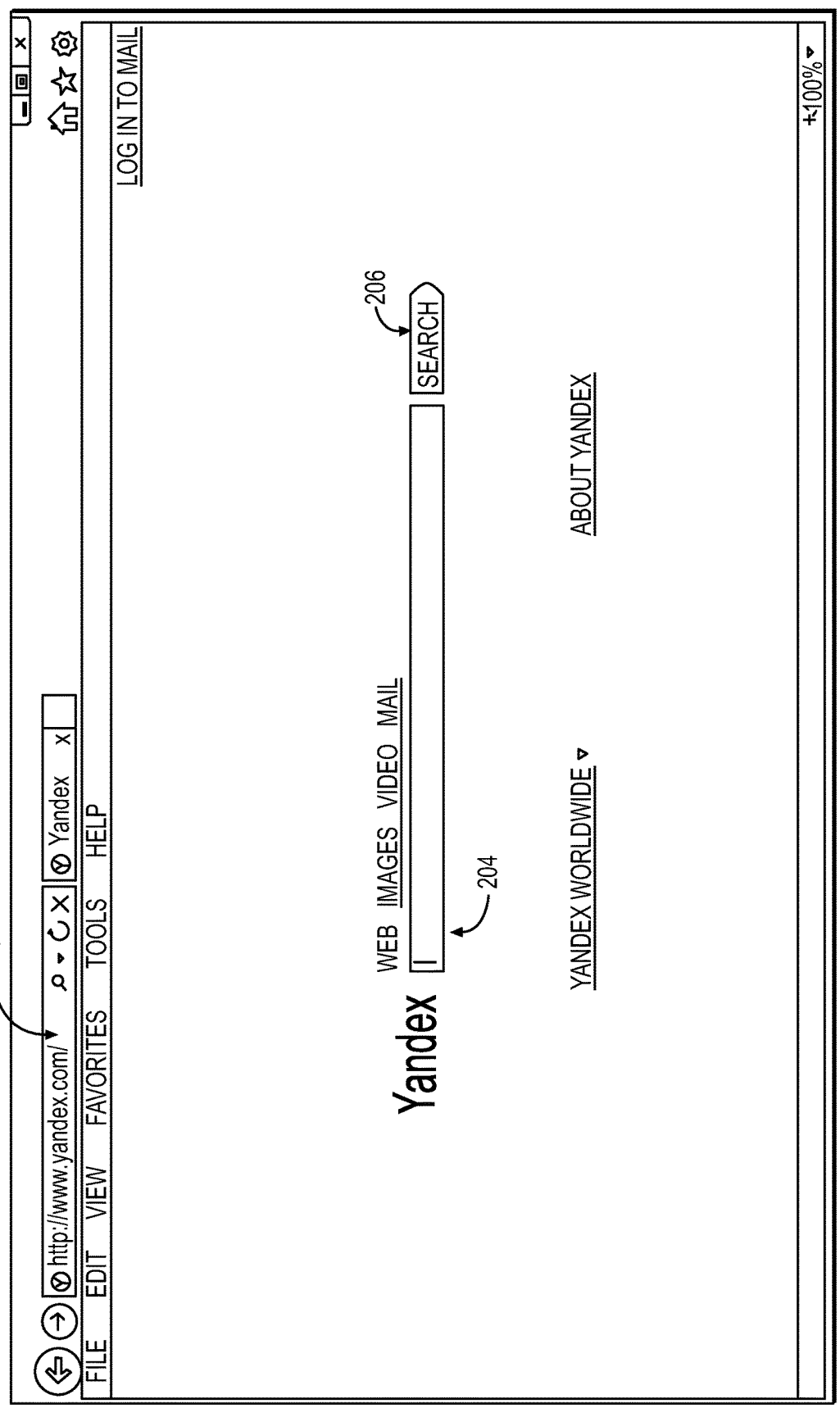
FIG. 2 is a sample web browser screen shot showing the resource (a search engine) located at the URL http://www.yandex.com.

In the implementation shown in FIG. 2, a user of a personal computer running Microsoft Internet Explorer (version 9) browser 200 on the Microsoft Windows Vista™ operating system has chosen to navigate to the English language home page of the Yandex search engine, which is the resource located at the URL http://www.yandex.com 202. (The means by which the user has navigated to this particular page are not relevant to the present technology. For instance, the user could have directly typed in the address in the URL field, or could have selected the address from amongst their "favorites" having been previously entered into the web browser. Any means of navigation is included with the scope of the present technology.)

As can be seen FIG. 2, the information received from the resource has caused the browser 200 to render a search field 204 in the middle of the web page. The search field 204 into which the user types (or otherwise inputs) search query term(s) in respect of the information that the user is seeking via the search. The information received from the resource has also caused the browser to render a search button 206 on the web page next to the search field 204. When the user has inputted their desired search query term(s), they can click the search button 206 to indicate that search results are requested, for example. (In other implementations, the user may indicate that search results are requested in any one of a number of different ways. The present technology is not restricted to any particular method.)

Figure 3:
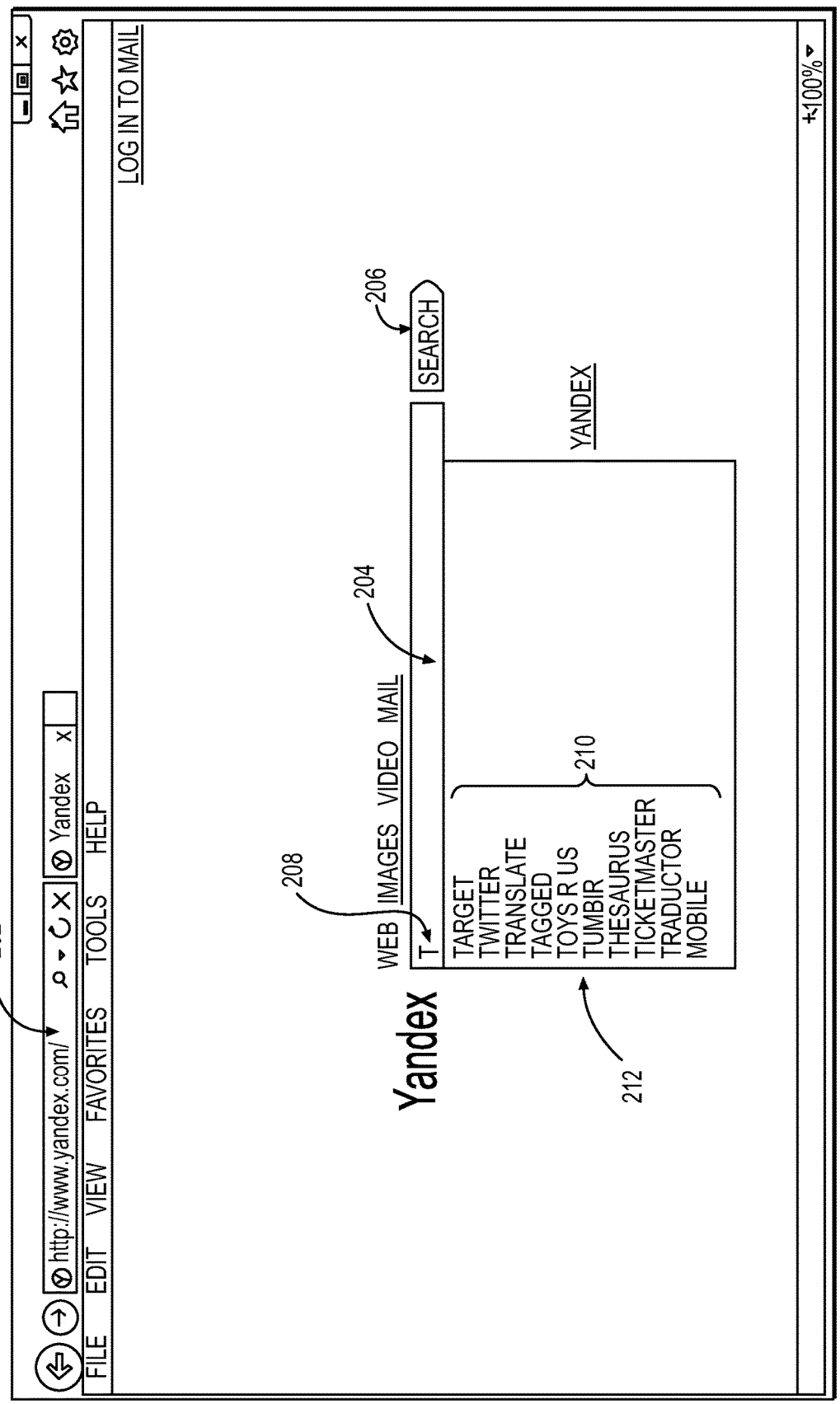
FIG. 3 is a sample web browser screen shot showing the resource of FIG. 2 wherein the letter "t" has been entered into the search field, and a number of search query suggestions are shown.

Referring to FIG. 3, there is shown the same web page is in FIG. 2, with the exception that the user has typed the letter "t" 208 into the search field 204. In this implementation, the typing in of the letter "t" into the search field 204, has caused the client device (browser) to send to the server (search engine) various elements of a search query including the letter "t" (being the sole query term at this point in time). (The other elements of the search query may include (in various embodiments): the geographical region of the client device, the local time and the time zone of the client device, the URL of the webpage the request is being sent from, and any relevant content displayed on and/or embedded into the resource where the search engine is shown.) In response, the server (search engine query suggestion system) has sent a number of search query suggestions 210, including the search terms: target, twitter, translate, etc. to the client device. In this implementation, the client device (browser) displays these search query suggestions 210 in a drop down box 212. The user may click on one of the search query suggestions 210 or may continue to type additional letters in the search field 204. As the user types additional letters (not shown) elements of additional search queries are sent from the client device (browser) to the server (search engine). In this implementation, those elements are the same as they were in respect of the earlier search query, with the exception that the search terms change each time additional text is inputted into the search field 204. In this implementation, the server (search engine search query suggestion system) will send search query suggestions 210 to the client device in respect of elements of a search query it receives (i.e. each time the user inputs an additional character into the search field 204), which will cause the suggestions in the drop down box to appear to be adapted to prefix formed by the letters being inputted into the search field 204.

Use of a Search Engine Incorporating the Present Technology

In an implementation of the present technology, be it a method, system, or software may be viewed from two different points of view, that of the client device and that of the at least one server.

Figure 6:
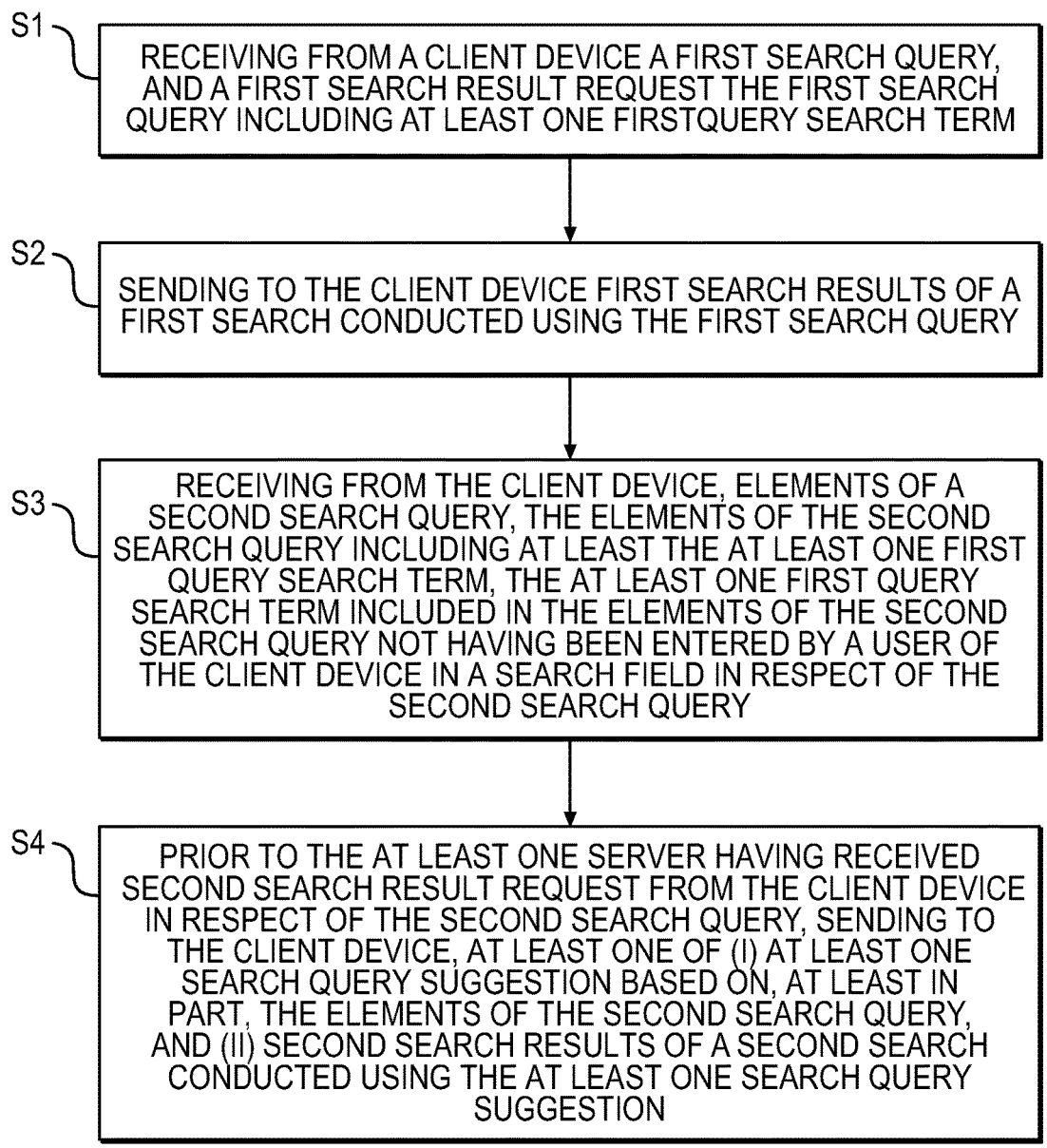
FIG. 6 is a flow chart showing an implementation being a method from the point of view of at least one server.

Referring to FIG. 6, there is shown a flow chart being an implementation of a method of the present technology from the point of view of the at least one server, including:
  (S1) Receiving from a client device a first search query and a first search result request in respect of the first search query, the first search query including at least one first query search term.
  (S2) Sending to the client device first search results of a first search conducted using the first search query.
  (S3) Receiving from the client device, elements of a second search query, the elements of the second search query including at least the at least one first query search term, the at least one first query search term included in the elements of the second search query not having been entered by a user of the client device in a search field in respect of the second search query.

(S4) Prior to the at least one server having received a second search result request from the client device in respect of the second search query, sending to the client device, at least one of (i) at least one search query suggestion based on, at least in part, the elements of the second search query, and (ii) second search results of a second search conducted using the at least one search query suggestion.

Figure 7:
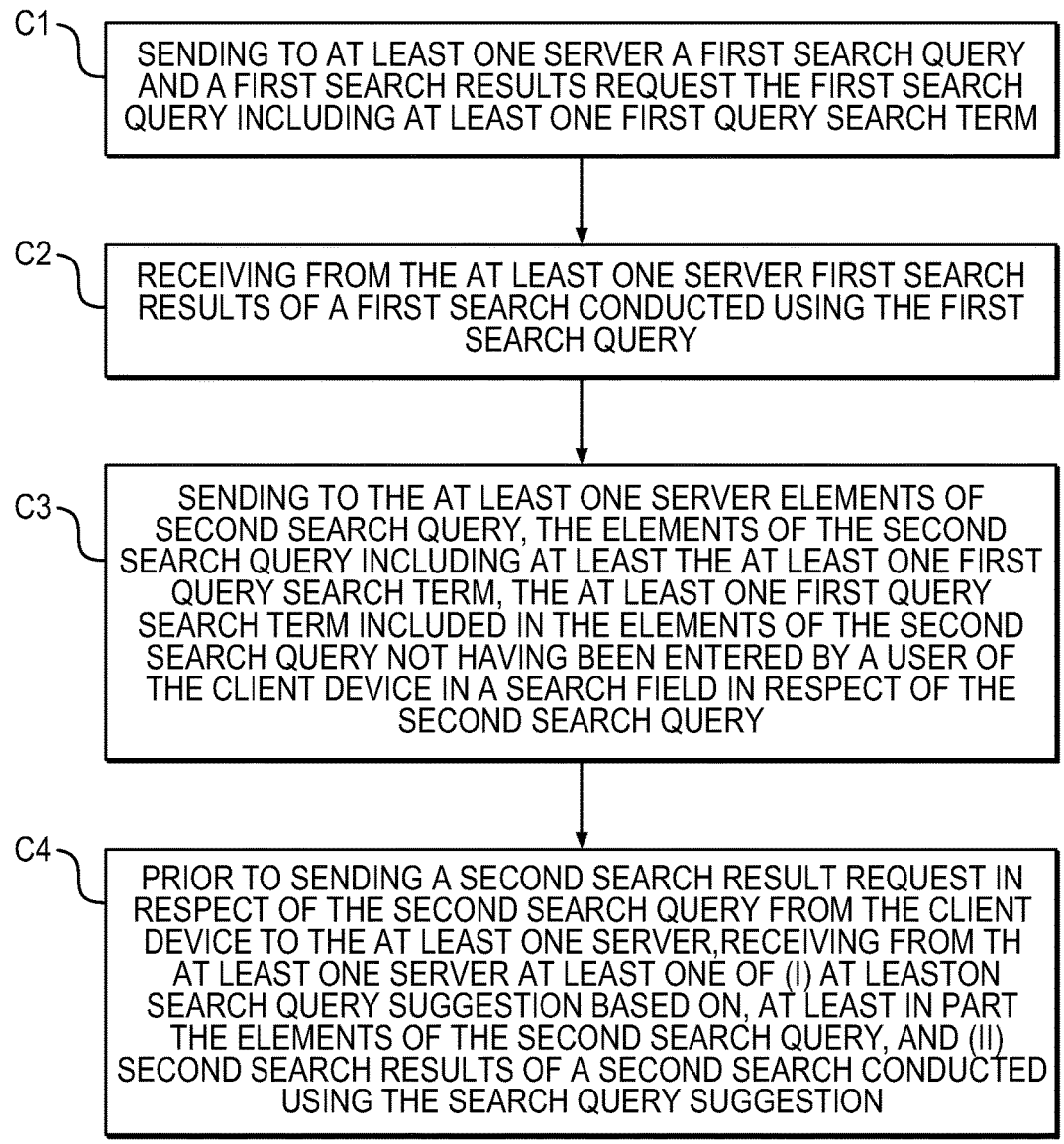
FIG. 7 is a flow chart showing an implementation being a method from the point of view of a client device.

Referring to FIG. 7, there is shown a flow chart being an implementation of a method of the present technology from the point of view of the client, including:

(C1) Sending to at least one server a first search query and a first search result request in respect of the first search query, the first search query including at least one first query search term.

(C2) Receiving from the at least one server first search results of a first search conducted using the first search query.

(C3) Sending to the at least one server elements of a second search query, the elements of the second search query including at least the at least one first query search term, the at least one first query search term included in the elements of the second search query not having been entered by a user of the client device in a search field in respect of the second search query.

(C4) Prior to sending a second search result request in respect of the second search query from the client device to the at least one server, receiving from the at least one server at least one of (i) at least one search query suggestion based on, at least in part, the elements of the second search query, and (ii) second search results of a second search conducted using the search query suggestion.

As a non-limiting example of the methods set forth above. As a first step, a user may input into the search field 204 of a search engine web page (e.g. that shown in FIG. 2) the word "patent" as a search term and click the search button. The word "patent" thus forms one of a number of elements of a search query (the word "patent" being a search term element) that is sent from the client device (browser) to the at least one server (search engine). The other elements of the search query are in this implementation: the geographic region of the client device and the web page from which the request is being sent. All of these elements of the search query are sent from the client device to the at least one server along with a request for search results (as the search button was clicked by the user) (C1). The at least one server receives the search query elements (S1), and depending on the configuration of the search engine software and hardware, may either carry out the search (in one implementation) or cause the search to be carried out (in another). Afterwards, the at least one server (which may be the same or different hardware and/or software than that which received the original search query and search request) sends the search results (S2) to the client device, which receives them (C2).

Figure 4:
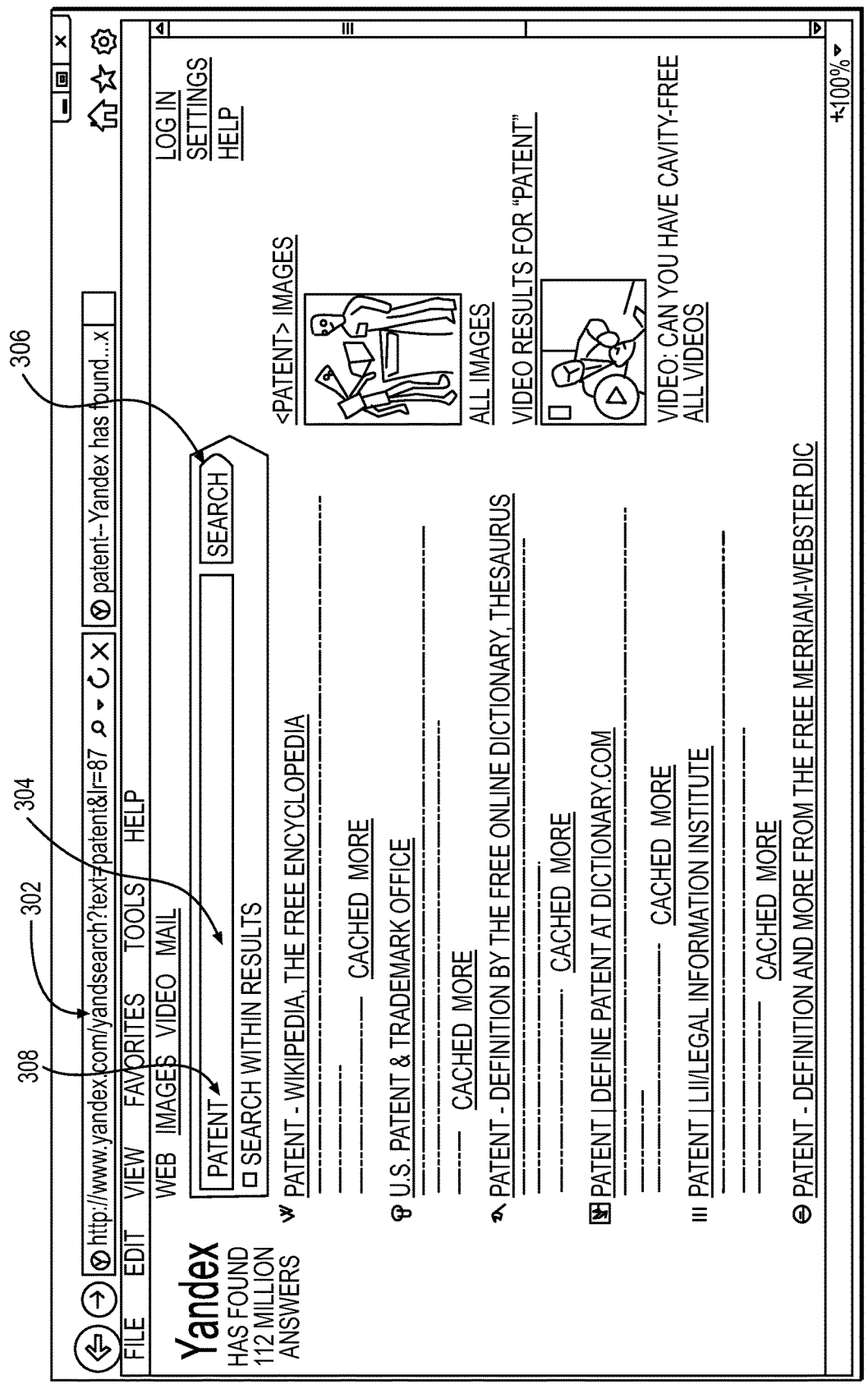
FIG. 4 is a sample web browser screen shot showing the search results of a search for the word "patent" and the associated URL for that web page: http://www.yandex.com/yandsearch?text=patent&lr=87.

In one implementation, the client device (browser (or mobile application, for example)) after having received the search results causes them to be displayed to the user as a web page. Referring to FIG. 4, there is shown a browser 300 rendering a web page showing the resource located at the URL http://www.yandex.com/ yandsearch?text=patent&lr=87 302. The resource is the search results page from the search engine Yandex™, showing the results of a search for word "patent". As can be seen in the URL 302 (both in the text above and in FIG. 4), the word "patent" appears in the URL for the search results page. Also located on the page is a search field 304 with the word "patent" being shown in the field 304. In this implementation, for purposes of illustration of the present technology, the "first" search is considered to be in respect of the search query including the search term "patent".

Figure 5:
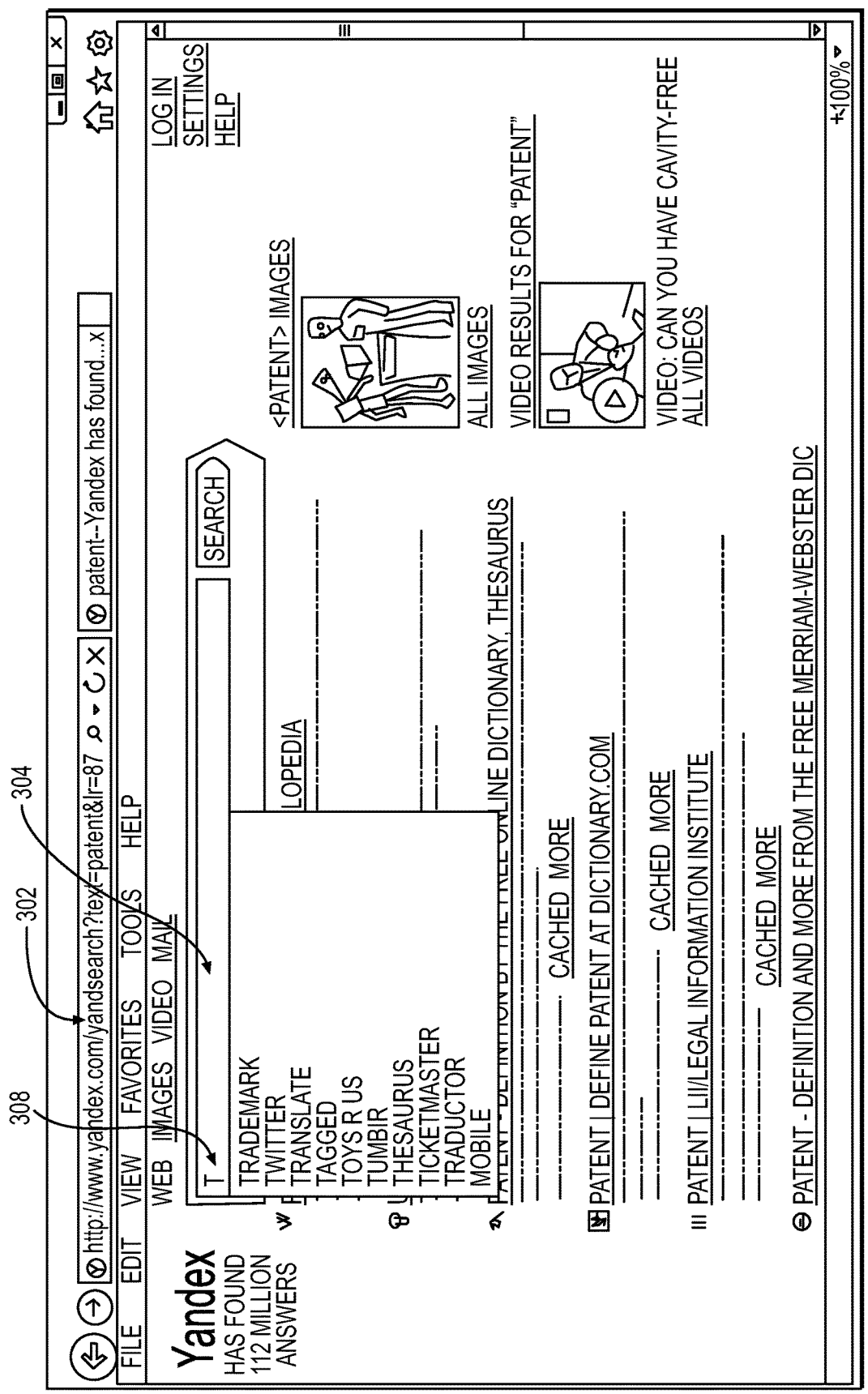
FIG. 5 is a sample web browser screen shot as in FIG. 4, wherein the letter "t" has been entered into the search field, and a number of search query suggestions are shown. The URL associated with that web page is the same as in FIG. 4: http://www.yandex.com/yandsearch?text=patent&lr=87.

Returning to the methods set forth above, and continuing with the example described above, presume that the search results (in respect of the search term "patent") did not provide the user with the information that they were seeking, and they desire to do another search. Referring to FIG. 5, the user remains on the search results page (i.e. the URL http://www.yandex.com/yandsearch?text=patent&lr=87) but erases the word "patent" from the search field 304 (i.e. clears the search field) and types the letter "t" in the search field (without hitting the "enter" key or clicking the search button or otherwise indicating that they desire the results of search). At this time the client device (browser (or mobile application, for example)) sends to the at least one server (the search engine) elements of a second search query, including the search term "patent" from the first search query. (C3) (The search term "patent" from the first query is obtained from the URL of the web page via the sample algorithm set forth below; that algorithm being a non-limiting example. It should be noted the user has not typed or otherwise inputted the search term "patent"—in fact they in this implementation erased it from the search field—but because, in this implementation, they have remained on the search result web page in respect of the search query including the search term "patent", that term becomes one of the elements of a second search query, which includes as another element the letter "t", in respect of which the search engine search suggestion system will provide search query suggestions.) The other elements of the search query are in this implementation: the geographic region of the client device and the web page from which the request is being sent. All of these elements of the second search query are received by the server (S3). The server (search engine search query suggestion system) then sends back to the client device search query suggestions based on the elements received (S4). (In this implementation the search engine query selection system employs an algorithm such as the one set forth below, in order to lower the relevance of search query suggestions that would be more relevant in geographic regions other than that in which the client device is located.) The client device (browser (or mobile application, for example)) receives and renders those search query suggestions (C4).

To illustrate the above, still referring to FIG. 5, once again, although the user has not yet indicated their desire for search results, in response the typing of the letter "t", the search engine query suggestion system has sent a number of search query suggestions 310, including the search terms: trademark, twitter, translate, etc., which are displayed in a drop down box 312. As can be seen in comparing the suggestions 310 with those 210 of FIG. 3, the search engine query suggestion system (because it has included the word "patent" (of the first search) when deriving the search query suggestions, has yielded a search query suggestion of "trademark", which was not the case where there was no previous search term indicated in the URL of the search page.

In the example above, the search query suggestion of "trademark" is ranked as the most relevant suggestion. The ranking is based on the probability analysis that determines what may the most desired query suggestion for the user. A probability analysis includes the analysis of the term "patent" (which may include its popularity in search history with respect to the general public, the client device and/or the logged-in user account). The probability analysis may also include the considerations of the geographical location of the device, as well as the time and time zone. Additionally, the probability analysis may include the most probably search query suggestion containing the search query term "t" in relation to the search query term "patent".

It should be understood that the when the user does not type anything in the search field 304, in one implementation, the search query suggestion system may provide search query suggestions that are based and are ranked by the probability analysis of the second query search elements that do not yet contain any second query search terms.

Sample Algorithms

The sample algorithm below can be used to implement the technology described herein, with respect to obtaining the first search query search terms from a URL.

```
if (!input.PreviousQuery.empty( )) {
    TReformulationsRecords queryReformulations;
    if (Reformulations.Find(input.PreviousQuery,
        &queryReformulations)) {
        Stroka utfPrefix = WideToUTF8(input.Prefix);
        for (TReformulationsRecords::TConstIterator it =
queryReformulations.Begin( ); it != queryReformulations.End( ); ++it) {
            int qId = it->QueryId;
            Stroka text = QueryData.GetQueryText(qId);
            if (text.has_prefix(utfPrefix))
                ranker.OnReformulation(qId, it->Rank);
        }
    }
}
```

The sample algorithm below can be used to implement the technology described herein, with respect to lowering the relevance of suggested search queries that would be more relevant in regions other than that in which the client device is located.

```
static float ReformulationRank(const TSuggestQueryData &queryData,
const TInputData &input) {
    int numRegions = queryData.RegionFreqSize( );
    if (numRegions == 0)
        return 1;
    float maxRegionalWeight = 0;
    for (ylist<i32>::const_iterator it = input.Regions.begin( ); it !=
    input.Regions.end( ); ++it) {
        for (int n = 0; n < numRegions; ++n) {
            float regWeight =
            queryData.GetRegionFreq(n).GetWeight( );
            if (regWeight > maxRegionalWeight)
                maxRegionalWeight = regWeight;
        }
    }
    return Rank(queryData, input) / maxRegionalWeight;
}
```

The sample algorithm below can be used to implement the technology described herein, with respect to formulating the search query suggestions in respect of a second search query in instances were none of the search query suggestions in respect of a first query were selected by a user.

```
bool IsGood(int usersThreshold, int totalUsers, const Wtroka
&query, const Wtroka &reformulation) const {
    if (Users < 2)
        return false;
    if (HasCommonFirstWord(query, reformulation) | |
HasCommonLargeWord(query, reformulation))
        return true;
    if (Users < usersThreshold | | Users < totalUsers / 500)
        return false;
    if (!HadDifferentRegions && Users < usersThreshold * 2)
        return false;
    return true;
}
```

Additional Implementation Details

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include client devices and servers. A client device and server are generally remote from each other and typically interact through a communication network. The relationship of client device and server arises by virtue of computer programs running on the respective computers and having a client-server relationship to each other.

The invention claimed is:

1. A computer-implemented method executable by a server, the method comprising:

receiving, from a client device, a first search query and a first search result request in respect of the first search query, the first search query including at least one first query search term;

sending, to the client device, first search results of a first search conducted using the first search query;

causing the client device to generate a search engine result page (SERP) comprising the first search results, the SERP further comprising (i) a search field with the at least one first query search term contained therein, and (ii) a unique uniform resource locator (URL) comprising an indication of the at least one first query search term;

responsive to determining that a user of the client device has deleted the at least one first query search term from the search field, and is entering a second search query comprising at least one second query search term in the search field of the SERP containing the first search results:

receiving, from the client device, elements of the second search query, the elements of the second search query including (i) at least the at least one first query search term obtained from the URL of the SERP without the server retrieving the at least one first query search term from stored data of the server, and (ii) the at least one second query search term; and prior to the server having received a second search result request from the client device in respect of the second search query, sending to the client device, at least one of (i) at least one search query suggestion based on, at least in part, the elements of the second search query, and (ii) second search results of a second search conducted using the at least one search query suggestion.

2. A computer-implemented method as recited in claim 1, wherein the at least one search query suggestion is further based on, at least in part, a search history associated with at least one second query search term included in the elements of the second search query.

3. A computer-implemented method as recited in claim 1, wherein the at least one search query suggestion is further based on, at least in part, at least one of:

a search history associated with the client device;
a search history associated with a logged-in user account;
search trends within a period of time preceding having received the elements of the second search query;
a location of the client device;
a predicted language of the search terms of the second search query;
a time of the client device;
a time zone of the client device; and
a probability analysis.

4. A computer-implemented method as recited in claim 1, wherein the at least one search query suggestion is a plurality of search query suggestions.

5. A computer-implemented method as recited in claim 1, wherein sending, to the client device via the at least one server, at least one of (i) at least one search query suggestion based on, at least in part, the elements of the second search query, and (ii) second search results of a second search conducted using the at least one search query suggestion, is sending, to the client device via the at least one server, both of (i) at least one search query suggestion based on, at least in part, the elements of the second search query, and (ii) second search results of a second search conducted using the at least one search query suggestion.

6. A computer-implemented method as recited in claim 1, further comprising:
   receiving, from the client device via the at least one server, the first search result request; and
   causing, via the at least one server, the first search to be conducted to yield the first search results.

7. A computer-implemented method as recited in claim 1, further comprising, after receiving the elements of the second search query from the client device, causing, via the at least one server, the second search to be conducted to yield the second search results.

8. A computer-implemented method as recited in claim 1, wherein the elements of the second search query include no second query search terms.

9. A system comprising:
   at least one server, the at least one server having a non-transient computer information storage medium storing program instructions that when executed by a computer processor effect:
      receiving, from a client device, a first search query and a first search result request in respect of the first search query, the first search query including at least one first query search term;
      sending, to the client device, first search results of a first search conducted using the first search query;
      causing the client device to generate a search engine result page (SERP) comprising the first search results, the SERP further comprising (i) a search field with the at least one first query search term contained therein, and (ii) a unique uniform resource locator (URL) comprising an indication of the at least one first query search term;
      responsive to determining that a user of the client device has deleted the at least one first query search term from the search field, and is entering a second search query comprising at least one second query search term in the search field of the SERP containing the first search results:
         receiving, from the client device, elements of the second search query, the elements of the second search query including (i) at least the at least one first query search term obtained from the URL of the SERP without the at least one server retrieving the at least one first query search term from stored data of the server, and (ii) the at least one second query search term; and
         prior to the at least one server having received a second search result request from the client device in respect of the second search query, sending, to the client device, at least one of (i) at least one search query suggestion based on, at least in part, the elements of the second search query, and (ii) second search results of a second search conducted using the at least one search query suggestion.

10. A system as recited in claim 9, wherein the at least one search query suggestion is further based on, at least in part, a search history associated with at least one second query search term included in the elements of the second search query.

11. A system as recited in claim 9, wherein the at least one search query suggestion is further based on, at least in part, at least one of:
   a search history associated with the client device;
   a search history associated with a logged-in user account;
   search trends within a period of time preceding having received the elements of the second search query;
   a location of the client device;
   a predicted language of the search terms of the second search query;
   a time the client device;
   a time zone of the client device; and
   a probability analysis.

12. A system as recited in claim 9, wherein the at least one search query suggestion is a plurality of search query suggestions.

13. A system as recited in claim 9, wherein the program instructions for effecting, sending to the client device via the at lease one server, at least one of (i) at least one search query suggestion based on, at least in part, the elements of the second search query, and (ii) second search results of a second search conducted using the at least one search query suggestion, are program instructions effecting sending, to the client device via the at least one server, both of (i) at least one search query suggestion based on, at least in part, the elements of the second search query, and (ii) second search results of a second search conducted using the at least one search query suggestion.

14. A system as recited in claim 9, wherein the program instructions further effect,
   receiving, from the client device via the at least one server, the first search result request; and
   causing, via the at least one server, the first search to be conducted to yield the first search results.

15. A system as recited in claim 9, wherein the program instructions further effect, after having received the elements of the second search query from the client device, causing, via the at least one server, the second search to be conducted to yield the second search results.

16. A system as recited in claim 9, wherein the elements of the second search query include no second query search terms.

17. A non-transient computer information storage medium storing program instructions that when executed by a computer processor of a client device, effect:
   sending, by the client device to at least one server, a first search query and a first search result request in respect of the first search query, the first search query including at least one first query search term;
   receiving, by the client device from the at least one server, first search results of a first search conducted using the first search query;
   generating a search engine result page (SERP) comprising the first search results, the SERP further comprising (i) a search field with the at least one first query search term contained therein, and (ii) a unique uniform resource locator (URL) comprising an indication of the at least one first query search term;
   responsive to determining that a user of the client device has deleted the at least one first query search term from the search field, and is entering a second search query comprising at least one second query search term in the search field of the SERP containing the first search results:
      sending, by the client device to the at least one server, elements of the second search query, the elements of the second search query including (i) at least the at least one first query search term obtained from the URL of the SERP, and (ii) the at least one second query search term; and
      prior to sending a second search result request in respect of the second search query from the client device to the at least one server, receiving, by the client device from the at least one server, at least one of (i) at least one search query suggestion based on, at least in part, the elements of the second search query, and (ii) second search results of a second search conducted using the search query suggestion.

18. A non-transient computer information storage medium as recited in claim 17, wherein the program instructions further effect, after receiving the first search results and prior to sending the elements of the second search query, clearing, by the client device, the search field of any search terms having been entered by the user of the client device.

* * * * *